Sept. 22, 1931. G. K. BAINBRIDGE 1,824,110
PLASTIC MEASURING AND CUTTING MACHINE
Filed May 24, 1930 4 Sheets-Sheet 1

INVENTOR
G. K. Bainbridge
BY
ATTORNEY

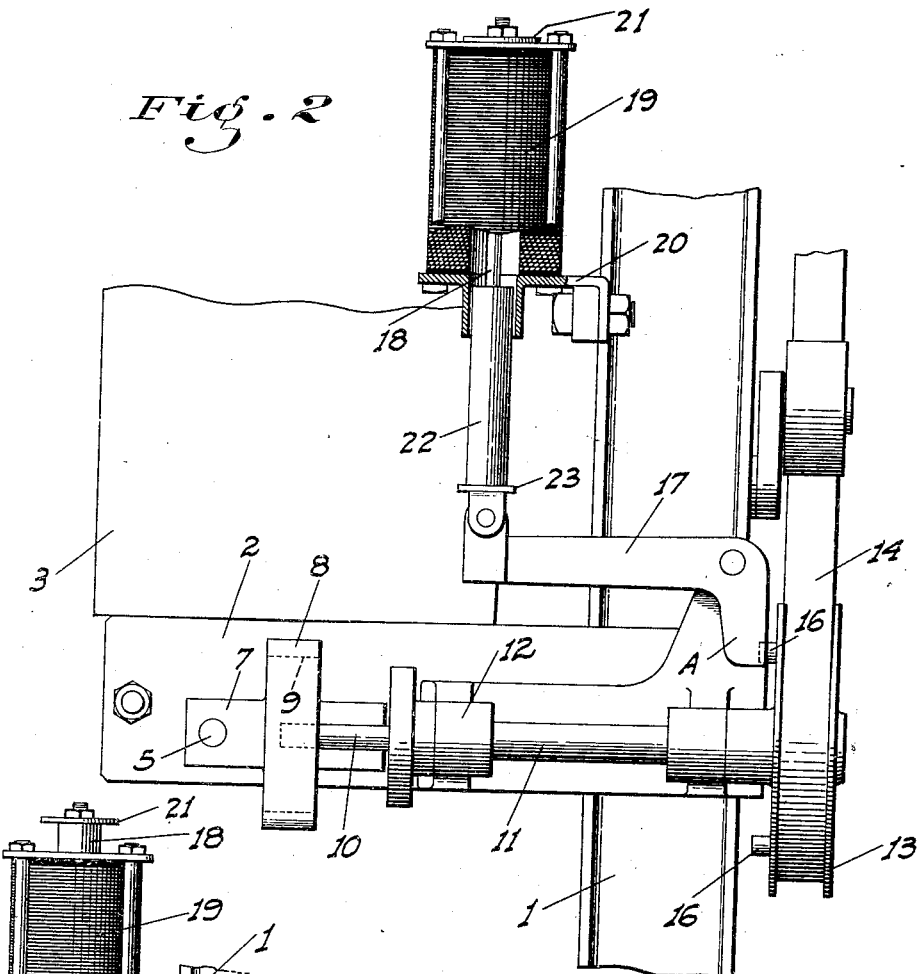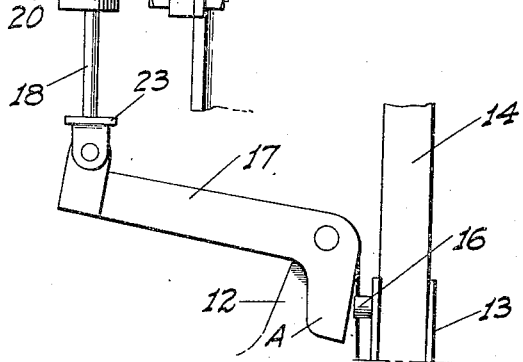

Sept. 22, 1931.    G. K. BAINBRIDGE    1,824,110
PLASTIC MEASURING AND CUTTING MACHINE
Filed May 24, 1930    4 Sheets-Sheet 3

INVENTOR
G. K. Bainbridge
BY
ATTORNEY

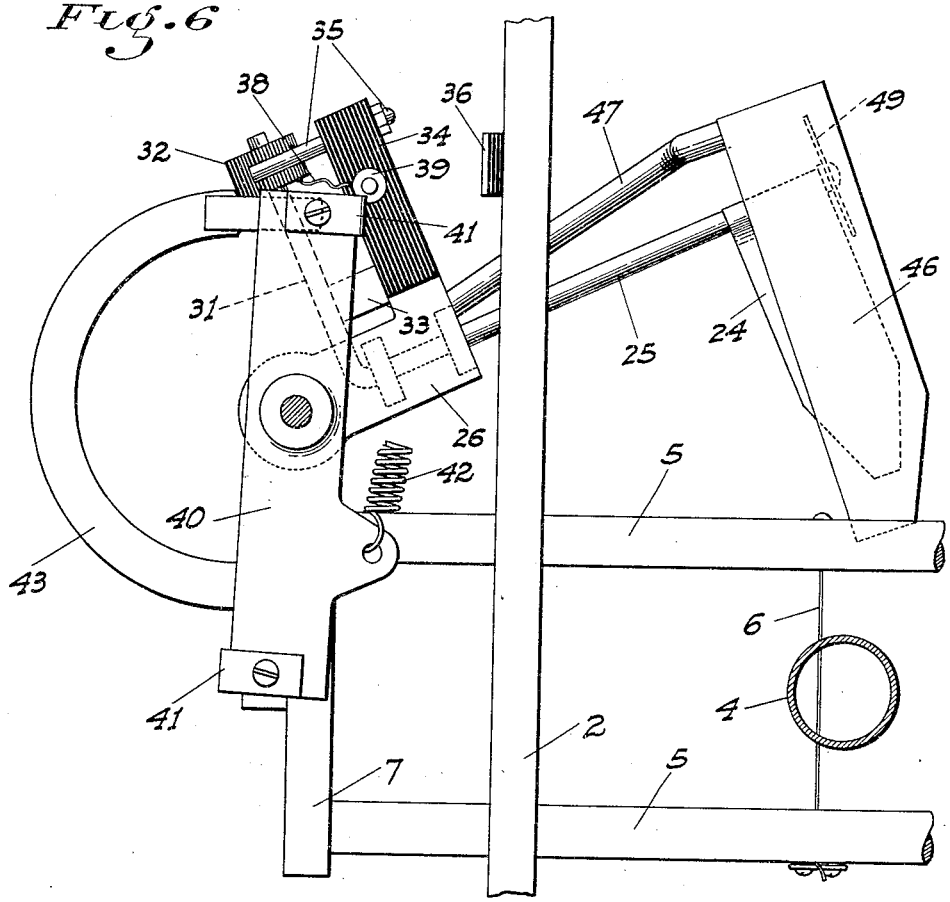
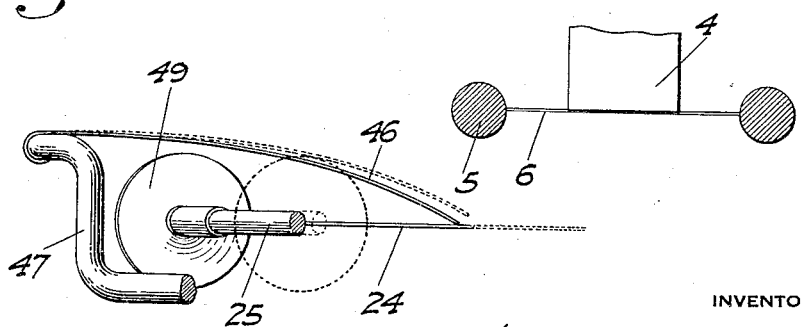

Patented Sept. 22, 1931

1,824,110

UNITED STATES PATENT OFFICE

GEORGE K. BAINBRIDGE, OF RIPON, CALIFORNIA

PLASTIC MEASURING AND CUTTING MACHINE

Application filed May 24, 1930. Serial No. 455,237.

This invention relates to machines for cutting plastic material, such as candy, into pieces of predetermined length as the material issues from the press of the machine. The present machine has certain features in common, as to the general principle of operation, with the machine shown in my Patent No. 1,660,855 dated February 28, 1928, but is an improvement thereover in various ways, as will be seen later.

As the major objects of the present invention I have particularly provided an improved mechanism for controlling the closing of the switch which actuates the stop-release solenoid; an improved form of connection between the solenoid and stop release member controlled thereby so that a relatively small solenoid and a corresponding small amount of current may be used; and a means for automatically wiping off the metering blade after each successive engagement of the latter with the material, so that said blade is kept clean at all times.

These objects I accomplish by means of such structure and relative arrangement of parts as will fully appear by a perusal of the following specification and claims.

In the drawings similar characters of reference indicate corresponding parts in the several views:

Fig. 2 is a fragmentary side elevation of the machine showing the driving mechanism for the cutting wire and the holding mechanism of said driving mechanism in its holding position.

Fig. 3 is a similar fragmentary view showing the holding member moved to a release position.

Fig. 6 is a top plan view of the switch and metering blade unit, showing the blade withdrawn from the plane of the spout.

Fig. 7 is a side view of the metering blade and wiper showing the blade as moved to be engaged by the wiper.

Figure 1:
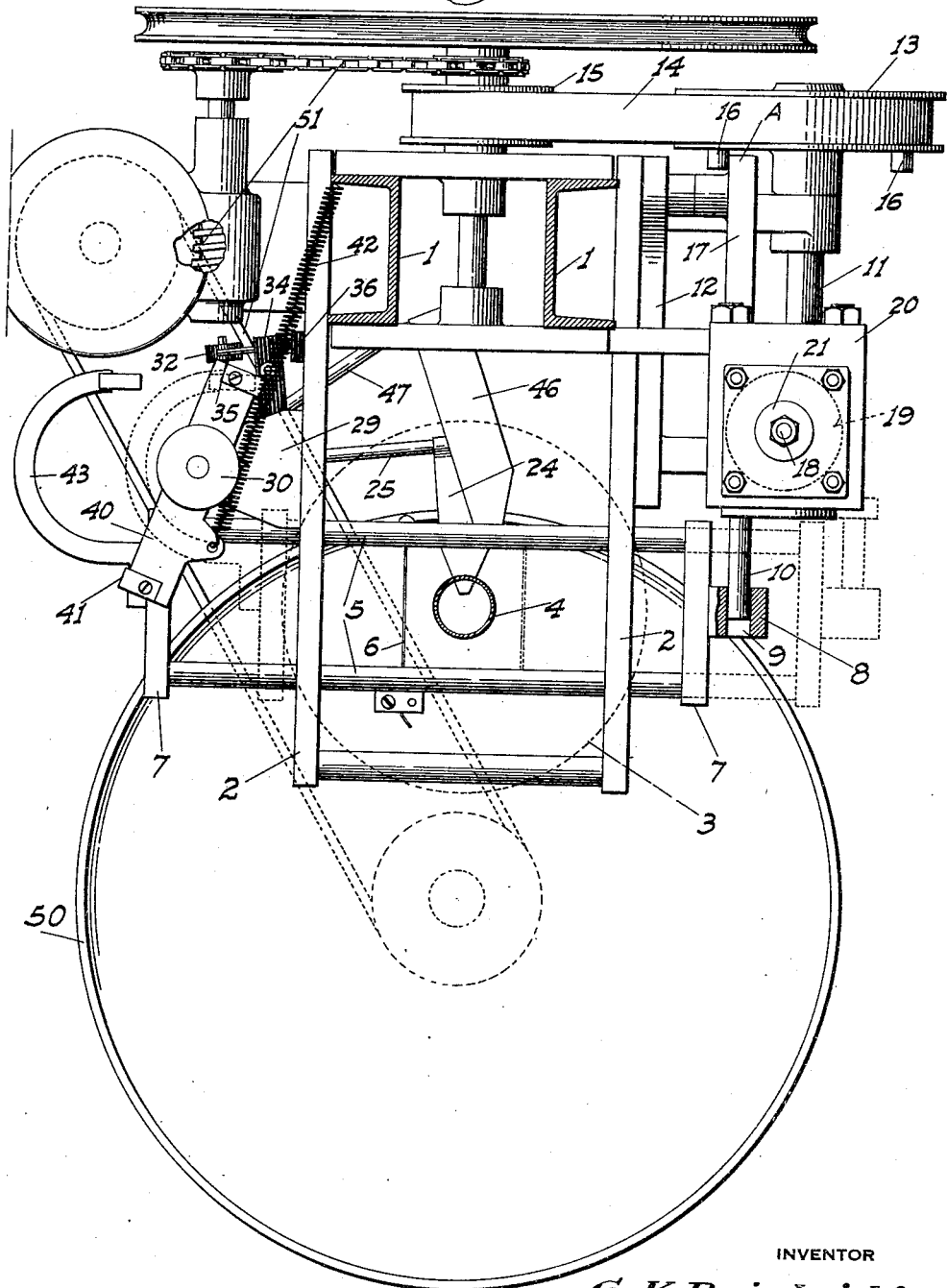
Fig. 1 is a fragmentary top plan view of my improved machine, showing the parts in position when the cutting wire is held at one end of its stroke.

Referring now more particularly to the characters of reference on the drawings, the machine includes transversely spaced uprights 1 which support horizontal and transversely spaced frame bars 2. These bars support the cylinder 3 of the press in which the material to be measured and cut is carried, and which has a spout 4 depending therefrom between the bars. The material is maintained under pressure in the press and is extruded continuously from the spout while the machine is in operation, as is commonly the case with machines of this general character. Slidably mounted in the bars for movement crosswise thereof are horizontal rods 5, one on each side of the plane of and adjacent the bottom of the spout, and which support a cutting wire 6 which extends between the said rods and is adapted to pass closely against the bottom of the spout. The rods outwardly of the bars are connected by rigid heads 7. One of said heads has a yoke 8 having a vertical guide slot 9 which is engaged by a horizontal crank-pin 10. The axis of this pin is at right angles to the axis of the rods 5 and is mounted in connection with a shaft 11 journaled in a bracket 12 fixed on the adjacent bar 2. The end of the shaft opposite the pin has a pulley 13 fixed thereon which is engaged somewhat loosely by a driving belt 14 which also passes around a driving pulley 15; said driving pulley being constantly driven during the operation of the machine by any suitable power means. The throw of the crank pin is sufficient to move the rod unit a distance such that the cutting wire will be moved from a position clear of the spout on one side, to a similar position on the other side, as indicated in Fig. 1.

Diametrally opposed pins 16 project outwardly from one side of the pulley 13 into the path of the short depending arm A of a bellcrank 17, which is pivoted on the bracket 12. The outer end of the long arm of the bellcrank is connected to an upstanding rod 18 which projects freely through the vertical coil 19 of a solenoid which is mounted on a bracket 20 supported from the uprights 1. The upper end of this rod above the coil carries an enlarged head or washer 21. The core of the solenoid is in the form of a sleeve 22 which loosely surrounds the rod and also loosely fits in the coil. The downward movement of the sleeve is limited by a flange 23 provided at the lower end of the rod 18, in which position of the sleeve its upper end is adjacent the lower end of the coil, as shown in Fig. 2. When the parts are in the above named position the arm A of the bellcrank is in the path of the pins 16, so that the pulley can only turn until one of said pins engages said arm, the driving belt then slipping on the pulley 13. The crank pin is then at one end or the other of its stroke in a horizontal plane, and the cutting wire unit is therefore at one end or the other of its stroke. As soon as the solenoid is energized the sleeve-core is drawn upwardly in the coil, and being loosely mounted in connection therewith, moves upwardly with sufficient velocity to strike the washer 21 with a hammer-like blow. This raises the washer and rod so that the bellcrank is also moved very quickly and the arm A is drawn from engagement with the pulley pin as shown in Fig. 3. The pulley then again turns so that the crank pin moves the cutting wire unit across the spout, and as soon as said pin moves past the plane of the arm A the solenoid becomes deenergized and said arm returns into the path of the pins. The pulley can thus only rotate one half a turn or so that the cutting wire is moved once across the spout, and it is then held immovable until the solenoid is again energized. The above described means for actuating the bellcrank enables a relatively small solenoid and a correspondingly small amount of current to be consumed in its operation, since the strength of the solenoid is not depended on so much to move the bellcrank as is the sudden blow given by the sleeve-core to the rod 18.

The solenoid is thus energized when and only when a lump of material of predetermined length has issued from the spout 4 by the following means:

Disposed below the spout a certain distance and projecting part way across the plane of the same is a metering blade 24 which projects substantially at right angles to the longitudinal plane of the rods 5. This blade is fixed on and projects radially from one end of a rod 25 which extends horizontally to and is turnable in a bracket plate 26. This plate is fixed on a vertical sleeve 27 which is slidably but non-turnably mounted on a support 28. This support is turnably mounted against longitudinal movement in a bearing 29 supported by the adjacent frame 2. Upward and downward movement of the sleeve 27 relative to the support 28 is controlled by a hand turned rod 30 projecting above the latter and having operative screw connection with the sleeve in a manner common to various machine tools. By thus adjusting the sleeve, the metering blade and all parts connected to the sleeve are simultaneously adjusted vertically relative to the bottom of the spout, thereby of course governing the length of the material which will issue from the spout before engaging the metering blade.

Beyond the bracket 26 and outwardly of the plane of the adjacent bar 2, the rod 25 is turned at a right angle to form an extension 31 which is substantially parallel to the metering blade, and which at its outer end carries a counter-weight 32 just barely overbalancing the weight of the blade. The downward movement of the extension is limited by a plate 33 projecting under said extension from the bracket 26. The extension is parallel to an insulated block 34 which is mounted on the bracket 26 to the side extension nearest the frame. This block carries a contact member 35 which at one end overhangs the counterweight and at its opposite end is adapted to engage a vertical contact strip 36 secured to the adjacent frame 2.

Figure 4:
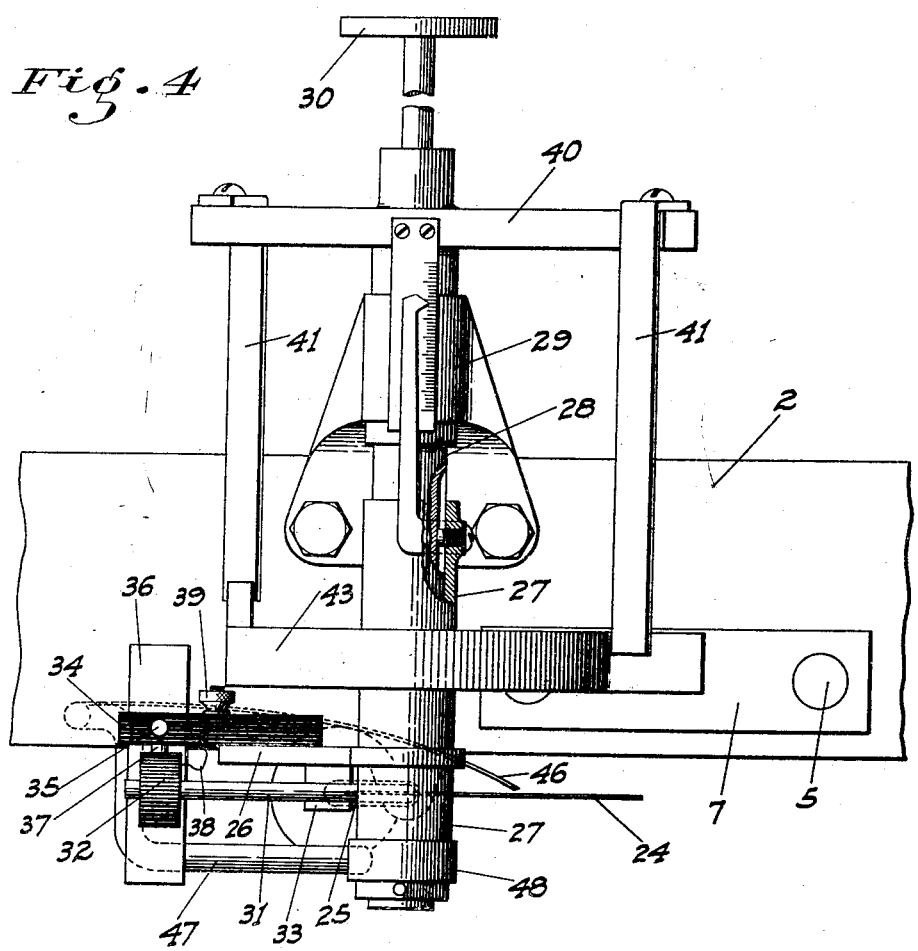
Fig. 4 is a fragmentary side elevation of the opposite side of the machine showing the solenoid controlling switches and the metering blade which controls the closing of one of said switches.

The counterweight carries a contact 37 insulated therefrom disposed under the contact 35. Said contact 37 is adapted to engage the contact 35 but is clear of and below the same when said extension 31 is resting on the plate 33. A flexible wire 38 extends from the contact 37 to a binding post 39 on the block 34, so that the actual wiring connections may be made to the binding post instead of directly to the counterweight contact, since the latter arrangement would interfere with the necessary delicacy of balance of the metering blade and connected parts. The above described structure is arranged so that the member 35 engages the strip 36 only when the blade 24 projects under the plane of the spout, or in the position shown in Fig. 1. This contact is thus made at the end of each stroke of the cutting wire unit by the following means:

Fixed in connection with the support 28 above the bearing 29 is a rigid cross-bear 40, from the ends of which semi-rigid but somewhat resilient arms 41 depend. A spring 42 between the cross bar and the frame of the machine acts to turn said bar and the parts connected thereto, so that the contacts 35 and 36 will be separated. The axis of the support 28 on which the bar is mounted is to one side of the cutting wire unit, and the adjacent head 7 of the latter has a member 43 secured thereto and projecting outwardly therefrom and whose ends are positioned to alternately engage the arms 41 on opposite sides of the same. This position of the arms relative to the member 43 is shown in Fig. 4. When the adjacent head of the cutting unit is moving away from the adjacent frame 2, the member 43 at its end nearest the head engages the corresponding arm 41 and pushes the same so that the bar 40 and parts connected thereto are turned against the resistance of the spring 42 in the direction to cause the contact 35 to approach the contact strip 36.

This is because the bracket 26 on which the contact 35 is mounted, turns with the bar 40; the sleeve 27, support 28 and said bar being turnable together as a single unit. These parts are arranged so that actual contact is made by the time the cutting unit reaches the limit of its travel in the above mentioned direction. Since the blade 24 is mounted on the rod 25, which in turn is mounted on the bracket 26 so as to swing therewith in a horizontal plane said blade 24 will then be moved to project under the spout in a position to be engaged by the material. With the return movement of the cutting unit and said head 7 toward the adjacent frame 2, the member 43 draws away from the arm 41 previously engaged and the spring 42 then acts on the bar 40 to turn the same so that the switch contact 35 (which is mounted on the bracket 26) is turned so as to be disengaged from the fixed contact strip 36. With the turning of the bracket 26 in a contact disengaging direction the blade 24 is moved clear of the spout, since as above stated, the blade supporting rod 25 is mounted on the bracket to turn therewith. This turning movement continues until the cutting unit has traveled approximately one-half the length of its stroke, when the other end of the member 43 engages the other arm 41 and again turns the bar 40 and its connected parts against the resistance of the spring 42, so that engagement of the switch contacts is again had by the time the cutting wire reaches the corresponding end of the stroke. The blade is again disposed under the spout and the cutting wire is now beyond the same ready for another cutting movement in the return or opposite direction. A measuring and cutting operation therefore takes place with each stroke of the wire 6, or in other words with each half revolution of the pulley 13.

It will be seen however that the complete closing of the solenoid circuit does not depend on the engagement of the contacts 35 and 36 alone but on the simultaneous engagement of the contacts 35 and 37 as well, and vice versa. When the measuring blade 24 projects under the spout, the counterweight 32 holds the contacts 35 and 37 separated, unless said weight is overcome, as is necessary to raise the contact 37 into engagement with the relatively stationary contact 35. This is done by the downward pressure of the lump of material 44 on the blade 27 as said material issues from the spout as shown in Fig. 5, and which of course must be a certain definite length in order to thus engage the metering blade.

Figure 5:
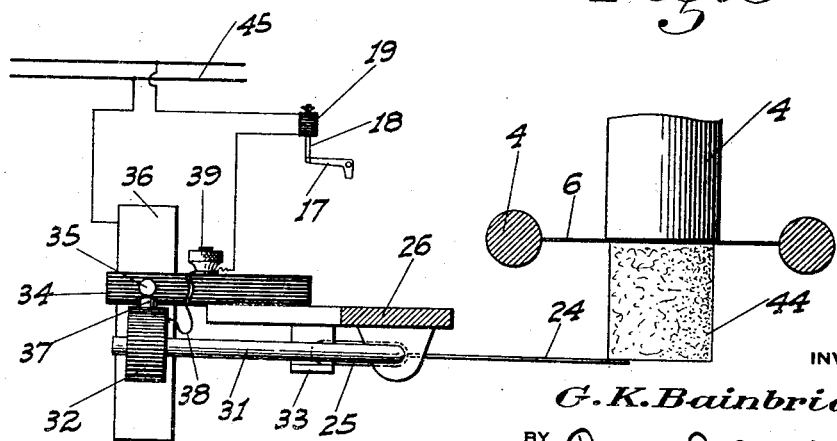
Fig. 5 is a fragmentary side view more or less diagrammatic showing the said switch as closed by the engagement of a piece of material with the blade.

The circuit is then closed from the line wires 45 through the strip 36, contacts 35 and 37 to the post 39, thence to the solenoid 19 and back to the line, as clearly shown in the diagram in Fig. 5.

The solenoid is then energized, causing the pulley which controls the movement of the crank pin 10 and the reciprocation of the cutting unit through a single stroke to be effected as previously explained. When the switch unit is then moved by the movement of the cutting unit, the contacts 35 and 36 are separated first, and the contacts 35 and 37 last, since the latter contacts remain engaged until the metering blade has been definitely withdrawn from under the lump of material and is relieved of the pressure thereof. This arrangement causes the circuit to be actually broken and any arcing action had, in the contacts 35 and 36. These contacts not needing the delicacy of balance of the metering blade unit may be made heavy enough to withstand such action.

In connection with the metering blade I have provided a means for wiping the same every time it is drawn clear of the spout, so that there is no danger of the material accumulating thereon to an extent such as would affect the balance of the blade and possibly cause the contacts 37 and 35 to be permanently engaged. This wiping device comprises a plate 46 disposed above the blade 24 and positioned at an acute downward angle toward the outer end of the blade and extending lengthwise of the same, so that one end may engage the upper surface of the blade for the full width of the same at its outer or spout end. The plate at its opposite end is flexibly mounted on the outer end of a rod 47 which projects radially from and is secured to a collar 48 turnably but non-slidably mounted on the sleeve 27. Raising and lowering of the sleeve therefore raises and lowers the wiper also so that it is always maintained in the same horizontal position relative to the measuring blade, but does not turn without turning of the sleeve and blade. Therefore when the blade turns away from the spout it passes under the stationary wiping plate and beyond the free scraping or wiping end of the latter, and said plate therefore scrapes any material from the upper surface of the blade.

To keep the pressure of the plate off the blade when the latter is in a measuring position under the spout, so as not to disturb the delicacy of balance then necessary, a disc 49 is mounted on the outer end of the blade supporting rod 25. This disc and the plate 46 are so disposed relative to each other that said disc engages and raises the plate clear of the blade when the latter is in an advanced position and is under the spout, as seen in dotted lines in Fig. 7; but moves clear of the plate and allows the same to engage the blade when the latter is withdrawn from the spout, as shown in full lines in said Fig. 7.

The spout preferably discharges the lumps as cut into a cylindrical and heated receptacle 50 positioned in eccentric relation to the spout. This receptacle is rotated at a continuous and slow speed by suitable driving connections 51 with the driving pulley 15. This enables the lumps as deposited in the receptacle to be accessible to the operator without her having to delve under the spout and adjacent parts of the machine and of course facilitates the engagement and subsequent handling of the lumps after they are cut.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a machine for measuring and cutting plastic material, a discharge spout depending from the press of the machine and from which the material to be cut issues, a cutting element movable across the end of the spout, a support for the element movable horizontally in a direction to enable the element to be thus moved, operating means applied to said support to reciprocate the cutting element back and forth across and beyond the spout in both directions whereby with each stroke of the support the cutting element will move across the spout to effect a cutting operation, and means controlling the functioning of said operating means actuated by the discharge of the material from the spout and to cause the same to be halted after each single stroke of the cutting element.

2. In a machine for measuring and cutting plastic material, a discharge spout depending from the press of the machine and from which the material to be cut issues, means for cutting off the material at the spout, a shaft, connections between the shaft and element for reciprocating the latter once with each revolution of the shaft, a slip-drive for the shaft, a stop offset from and fixed with the shaft, a bell-crank, one leg of which normally projects into the path of movement of the stop to prevent further rotation of the shaft, a tubular solenoid coil, a rod on the other leg of the bellcrank projecting freely through the coil, an enlarged member on the rod at the upper end of the coil, an energizable sleeve about the rod and having a free fit with said rod and in the coil, said sleeve being normally mainly below the coil, and means controlled by the issuance of material from the spout to a certain length to energize the coil whereby to draw the sleeve upwardly and throw it sharply against the member to turn the bell-crank so that it clears the stop.

3. In a machine for measuring and cutting plastic material, a discharge spout depending from the press of the machine and from which the material to be cut issues, a horizontal frame to one side of the spout, a cutting element to pass across the spout, supports for said element slidably mounted in said frame for movement transversely thereof, a head connecting said supports outwardly of the frame, means for reciprocating said supports, a vertical member turnably mounted in connection with the frame outwardly of the same, a rod mounted in connection with and projecting radially from the member, a metering blade fixed on the outer end of the rod and adapted to project under the spout and a certain distance below the same, spring means tending to turn the member in a direction to move the blade clear of the spout, means actuated by the engagement of the blade with the material issuing from the spout for enabling the cutter-support reciprocating means to function, and means between the head and the vertical member for moving the same against the resistance of the spring means so that the blade is moved to a material engaging position at the end of each stroke of the cutter supports.

4. In a machine for measuring and cutting plastic material, a discharge spout depending from the press of the machine and from which the material to be cut issues, a horizontal frame to one side of the spout, a cutting element to pass across the spout, supports for said element slidably mounted in said frame for movement transversely thereof, a head connecting said supports outwardly of the frame, means for reciprocating said supports, a vertical member turnably mounted in connection with the frame outwardly of the same, a rod mounted in connection with and projecting radially from the member, a metering blade fixed on the outer end of the rod and adapted to project under the spout and a certain distance below the same, spring means tending to turn the member in a direction to move the blade clear of the spout, means actuated by the engagement of the blade with the material issuing from the spout for enabling the cutter-support reciprocating means to function, a cross-bar secured to said member, arms depending from the ends of the bar, and means fixed on the head for alternate engagement with the arms to cause the bar and member to be turned, with the movement of the head, so that the blade is in a material engaging position a both ends of each stroke of the cutter supports while permitting the spring means to function to move the blade clear of the spout intermediate the ends of the stroke.

5. In a machine for measuring and cutting plastic material, a discharge spout depending from the press of the machine and from which the material to be cut issues, means for cutting off the material at the spout, operating means for said cutting means, stop means normally preventing said operating means from functioning, a normally denergized electric device for releasing said stop means, a circuit for said device, a vertical member turnably mounted in connection with the machine, a turnable rod mounted in connection with and projecting radially from the member, a metering blade fixed on the outer end of the rod and adapted to project under and a certain distance below the spout, means acting on the member to maintain the blade under the spout only before and after the functioning of the cutting means, a contact mounted in connection with said member, a second contact fixedly positioned to be engaged by said first contact only when the blade is in a material engaging position, and a third contact mounted in connection with the blade and arranged to engage said first contact only when the material engages the blade and the rod is turned; the second and third contacts being interposed in said circuit.

6. In a machine for measuring and cutting plastic material, a discharge spout depending from the press of the machine and from which the material to be cut issues, means for cutting off the material at the spout, operating means for said cutting means, stop means normally preventing said operating means from functioning, a normally deenergized electric device for releasing said stop means, a circuit for said device, a vertical member turnably mounted in connection with the machine, a turnable rod mounted in connection with and projecting radially from the member, a metering blade fixed on the outer end of the rod and adapted to project under and a certain distance below the spout, means acting on the member to maintain the blade under the spout only before and after the functioning of the cutting means, a contact mounted in connection with said member, a second contact fixedly positioned to be engaged by said first contact only when the blade is in a material engaging position, an extension projecting radially from the rod, a counterweight on said extension to hold the blade relatively raised, but arranged to be offset by the weight of the material engaging and ending to depress the blade, and a third contact on the extension positioned under the first contact and adapted to engage the same only when the blade is depressed; said second and third contacts being interposed in the circuit.

7. In a machine for measuring and cutting plastic material having a discharge spout depending from the press of the machine and from which the material to be cut issues, and means for cutting off the material at the spout including a reciprocating frame; a horizontal metering blade disposed on a level below the outer end of the spout, a support turnable on a vertical axis; a substantially radial arm mounted in connection with the support to turn therewith and on the outer end of which the blade is mounted; and means between the frame and support to oscillate the latter so that the blade is positioned under the spout at both ends of a single stroke of the frame, and is moved clear of the spout between the ends of such stroke.

8. In a machine for measuring and cutting plastic material having a discharge spout depending from the press of the machine and from which the material to be cut issues, and means for cutting off the material at the spout; a horizontal metering blade below the spout, a support turnably mounted on a vertical axis, connecting means between the support and blade to cause the latter to turn therewith, means functioning to turn the support and move the blade clear of the spout as soon as said blade is engaged by the material, a wiping plate disposed in a relatively fixed horizontal plane above the blade to engage the same when the blade is moved clear of the spout, an arm on the outer end of which the plate is mounted connected to said support in turnable relation thereto so as to remain stationary when the support is turned but to be moved vertically with the movement of the support, and means for thus moving said support at will.

9. In a machine for measuring and cutting plastic material having a discharge spout depending from the press of the machine and from which the material to be cut issues, and means for cutting off the material at the spout including a reciprocating frame; a horizontal metering blade below the spout, means functioning to move the blade horizontally and clear of the spout and material as soon as the blade is engaged by the material, a relatively stationary wiping plate extending lengthwise of and above the blade and set at an acute downward angle toward the end of the blade nearest the spout, and a vertical disc mounted in connection with the blade at its opposite end and positioned to engage and raise the plate only as the blade moves to a position under the spout.

10. In a machine for measuring and cutting plastic material, a discharge spout projecting from the press of the machine and from which the material to be cut issues, means to cut off the material at the spout, a metering blade positioned to project into the path of the material a certain distance beyond the spout, means to move the blade clear of the spout and material as soon as said material engages the blade, a plate positioned between the blade and spout to one side of the latter and in the path of movement of the blade away from the spout and adapted to engage the material engaging surface of the blade when the latter moves clear of the spout.

11. A structure as in claim 10, in which the blade engaging end of the plate is adapted for movement of the same away from said surface of the blade, and means mounted in connection with the blade to move and hold the plate away from the blade only when the latter is disposed in a material engaging position.

12. A structure as in claim 10, in which the blade engaging end of the plate is adapted for movement of the same away from said surface of the blade, and means functioning to move the plate from engagement with the blade only when the latter is disposed in a material engaging position.

13. In a machine for measuring and cutting plastic material, a discharge spout from which the material to be cut issues a cutting element movable across the end of the spout, means to reciprocate the element across the spout, means to halt the movement of the element at the end of each stroke, and means controlled by the issuance of material from the spout to a predetermined length after each stroke of the element to release the stop means and cause the reciprocating means to move the element through another stroke.

14. In a machine for measuring and cutting plastic material, a discharge spout from which the material to be cut issues a cutting element movable across the end of the spout, means to reciprocate the element across the spout, means acting to halt the movement of the element at the end of each stroke, and after the element has cut off a piece of material, and means governed by the subsequent issuance of material from the spout to a predetermined length for again placing the reciprocating means in operation.

In testimony whereof I affix my signature.

GEORGE K. BAINBRIDGE.